Aug. 6, 1963
H. C. WAGNER
3,100,155
MINIATURE CERAMIC CRUCIBLES FOR BURNING METAL SAMPLES, AND CERAMIC MATERIAL
Filed April 11, 1960
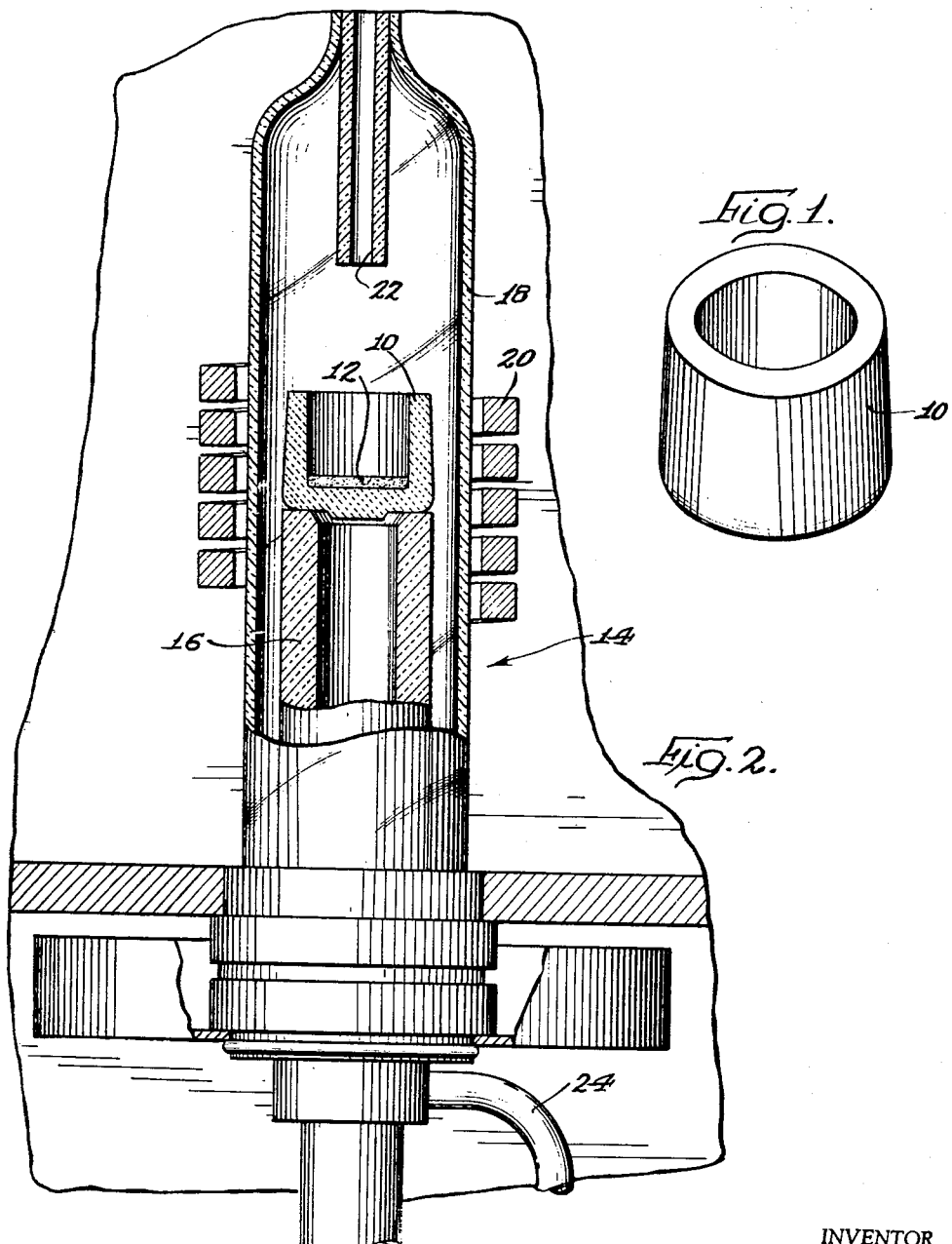
INVENTOR.
Harold C. Wagner
BY
Wupper, Gradolph & Low
Attys.

3,100,155
MINIATURE CERAMIC CRUCIBLES FOR BURNING METAL SAMPLES, AND CERAMIC MATERIAL
Harold C. Wagner, St. Joseph, Mich., assignor to Laboratory Equipment Corporation, St. Joseph, Mich., a corporation of Michigan
Filed Apr. 11, 1960, Ser. No. 21,255
4 Claims. (Cl. 106—62)

The present invention is directed specifically to the problem of overcoming the troublesome shortcomings and failures of miniature ceramic crucibles used in analytical combustion apparatus, and is a continuation-in-part of my copending patent application Serial No. 794,114, filed February 18, 1959, for Miniature Ceramic Crucibles for Burning Metal Samples and Ceramic Material, abandoned on or about September 24, 1960. In such use they contain metal samples which, in modern apparatus, are burned in oxygen at high oxygen flow rates and without substantial preheating of the crucible. In this service crucibles are subjected to such extreme thermal shock that prior type ceramic crucibles almost always crack or break, sometimes spoiling the analysis and occasionally damaging the analytical apparatus. Another principal cause of failure of prior crucibles used for this purpose has been an inability of the ceramic material of the crucible to adequately withstand the solvency or penetration action of the molten metals and metal oxides produced as a result of the combustion process.

One object of the invention is to provide, for use in burning metal samples or the like in analytical combustion apparatus, small ceramic crucibles formed of a new and improved ceramic composition which substantially eliminates cracking of the crucibles when they are subjected to the extreme thermal shock attending use of the crucibles in this service.

Another object is to provide crucibles of the character recited in the previous object which have a new and improved ceramic composition so resistant to penetration by molten metals and metal oxides as effectively to eliminate penetration as a cause of crucible failure in the analytical combustion of metal samples or the like.

A further object is to provide an inexpensive ceramic material of a new and improved composition capable of withstanding extreme thermal shock and having an exceedingly high resistance to slagging or penetration in the presence of molten metal and metal oxides.

Another object is to provide a novel ceramic material having the above characteristics and which is comprised of easily obtainable substances which are commercially availble in a substantially sulfur-free state.

A further object is to provide a novel ceramic material having the above set forth characteristics, and which, in addition, in one of its forms, provides an excellent fine-grained filtering material.

Other objects and advantages of the invention will become apparent from the following description, having reference to the drawings in which:

FIG. 1 is a perspective view of a ceramic crucible of the type forming the subject matter of this invention; and FIG. 2 is a partially sectioned front view illustrating typical analytical combustion apparatus shown associated with a crucible of the type of FIG. 1.

The crucible 10, shown in FIG. 1, is adapted to contain an analytical sample of a material, usually a metal, which is to be analyzed by combustion. A typical crucible of this type is about one and one-quarter inches in diameter and is usually used with a one gram sample. As illustrated, the crucible is shaped in accordance with the disclosure of patent application Serial No. 698,415, filed by William C. Rohn on November 25, 1957, for "Gas Analysis Crucible," and assigned to the assignee of the present application. The crucible 10 containing an analytical sample 12 is placed in analytical combustion apparatus 14 illustrated in FIG. 2. Combustion apparatus of this character is fully disclosed in U.S. Patent No. 2,809,100, issued October 8, 1957, to G. J. Krasl.

In the particular apparatus illustrated, the crucible is supported on a vertically movable pedestal 16 within a combustion chamber or bell jar 18 which is surrounded, as shown, by a high frequency induction coil 20. A jet of oxygen is played down into the crucible through a nozzle element 22 in the top of the combustion chamber 18. Unburned oxygen and gaseous combustion products are withdrawn from the combustion space through an exhaust outlet 24 at the bottom of the chamber 18 as shown.

Such gaseous products of combustion are then analyzed by combustion gas analysis apparatus of any suitable character which determines the carbon content, sulfur content, or other desired component of the gas, and hence of the sample burned.

The crucible 10 is typically formed of a ceramic material, and is usually used only for a single analysis. Even the best ceramic crucibles previously available for this service (formed essentially of zircon and ball clay, or such materials as alumina, or mullite) have been subject to troublesome shortcomings, including crucible failure which spoils the analyses, and the difficulty in obtaining sulfur-free zircon.

One of the most common causes of crucible failure has been cracking of the crucible when subjected to the extreme thermal shock incident to rapid heating of the crucible to high temperature as an incident to the burning of metallic samples for analysis. Typically, for instance, such crucibles will contain a sample which is heated from room temperature to over 2500° F. in less than one minute. As a matter of fact, cracking, to some extent at least, of almost all ceramic crucibles has been considered unavoidable, and prior developments in this field which produced a reasonably successful crucible have taken taken the form of improving the design of the crucible so as to control the direction of cracking.

Another serious cause of crucible failure has been the solvency action upon the hot ceramic material of the molten metal and metal oxides. This inability of prior crucibles adequately to withstand such slagging has resulted in rupture of the crucible structure, particularly through thermal cracks which are thus enlarged by the slagging action of the burning sample.

The present invention overcomes the above discussed difficulties by providing an inexpensive crucible having a new and improved ceramic composition which effectively eliminates crucible failures from either thermal shock or slagging action. These dual properties of extreme resistance to slagging and virtual immunity to thermal cracking are achieved by the use of a new ceramic material which is very largely comprised of silica. This is surprising since it has long been understood that silica, except in the form of fused quartz, has a low resistance to thermal shock because of inversions which take place during heating from room temperature to high temperatures.

The improvement accomplished by the new ceramic material stems largely from my discovery that extreme resistance to thermal shock and to slagging action can be achieved from a ceramic composition formed largely of silica, provided the silica particles are of proper size and are mixed with the proper amount of certain bonding agents and clay. The advantageous physical properties of the new ceramic material are dependent not only upon the amount of silica used in the composition, but also upon the degree of coarseness of the silica particles used in this composition.

The silica ingredient used in the new ceramic composition hereafter will be characterized as "coarse silica" and "fine silica." As used here, "fine silica" is regarded as silica particles which will pass through a 100-mesh screen, and "coarse silica" as being silica particles which will not pass through a 100-mesh screen. While the upper limit on the size of the coarse silica particles is not particularly important, it is preferred that the coarse silica be capable of passing through a 60-mesh screen.

The improved ceramic material having the desired properties referred to is obtained by mixing coarse silica, clay, and a proper bonding agent in proportions, which, for convenience, are set forth in the following table. A limited amount of fine silica can also be tolerated as shown, but is not necessary. For the purpose of this table, water is excluded.

| Ingredient | Permissible range | Preferred range |
| --- | --- | --- |
| Coarse silica (plus 100 mesh), percent | 30 to 75 | 45 to 60 |
| Fine silica, percent | 0 to 30 | 0 to 20 |
| Clay, percent | 15 to 45 | 30 to 35 |
| Bonding agent (expressed as pound moles of alkali metal oxides and alkaline earth oxides per 100 pounds of mix) | .010 to .026 | .017 to .023 |

It will be noted that the above table sets forth both a preferred proportionate range and an acceptable proportionate range for each ingredient. Both the preferred and permissible ranges in the table relate to comparatively pure ingredients having a rather definite chemical composition, as will be discussed in greater detail. As an example, the silica portion called for is assumed to be sufficiently pure $SiO_2$, so that any impurities present can be neglected. These percentages apply directly to many forms of silica commercially available which are 99% or more silicon dioxide. Commercial forms of silica of substantially this purity are known variously as quartz sand, potter's flint, silica sand, ground sand, etc.

With more particular reference to the above table, it is noteworthy that even though some fine silica can be used in the mix for the improved ceramic material, at least 30% (and preferably 45%) of the mix must be coarse silica. The upper limits on the coarse silica are, as stated, 75% permitted and 60% preferred. The proportion of fine silica can range up to 30% of the mix, but preferably does not exceed 20%. As indicated, no fine silica is required, but as a practical matter some will usually be used as an extender and because such use eliminates the processing cost of excluding this substance. If it does not exceed the proportion indicated, it does not appreciably alter the desired physical properties of the ceramic material and can therefore be tolerated.

The clay specified in the mix aids somewhat in the bonding and provides plasticity which is needed to enable the wet body to be shaped and to enable the article to hold together while green. It is present in the amount of 15 to 45% with 30 to 35% preferred. These percentages are based upon the assumption of pure clay, or upon the clay component of an impure clay, since adulterants may be unobjectionable as will be explained presently if they are allowed for. As a practical matter, the character of the clay is not particularly important if it is reasonable pure, and I have used both ball clay and kaolin for the purpose. One suitable natural clay which may be used in the percentages given is Florida kaolin which is repotred to have the following analysis:

|  | Percent |
| --- | --- |
| $Al_2O_3$ | 37.91 |
| $SiO_2$ | 46.12 |
| $Fe_2O_3$ | .67 |
| $TiO_2$ | .35 |
| $CaO$ | .40 |
| $MgO$ | .05 |
| $Na_2O$ | .32 |
| $K_2O$ | .26 |
| Ignition loss | 14.11 |

The bonding agent included in the ceramic mix to the permissible extent of .010 to .026 mole per 100 pounds with .017 to .023 mole per 100 pounds preferred, may be supplied by compounds containing elements of group I—subgroup A, and group II—subgroup A, of the periodic table; that is, the alkaline metals and alkaline earths. These elements include lithium, sodium, potassium, magnesium, calcium, strontium, and barium. The oxides, fluorides, sulphates, carbonates, silicates, and other compounds of these elements can be used if the quantity used is calculated as the oxide. As a practical matter, the bonding agent usually will be supplied, in part at least, from natural compounds or mixtures such as feldspar or talc for instance.

It is preferred that the bonding agent elements be supplied in the form of compounds which are not appreciably soluble in water. This avoids the migrating effect of soluble compounds on drying in which the soluble compounds tend to concentrate on the outer surface of the object formed of the ceramic material. Also, it has been found that a slightly better resistance to heat shock is provided by using bonding agents containing the alkaline metal elements, sodium, potassium, and lithium, rather than the alkaline earth elements of magnesium, calcium, strontium and barium. In general, it may be stated that only small amounts of the bonding elements are required since they exert a very pronounced effect upon the silica base material.

As to the raw materials actually used in making up the ceramic mix in accordance with the invention many low cost natural materials suitable for this use will supply more than one of the above discussed ingredients. This is particularly true of the bonding agent, since only a small amount is needed. As an example, the Florida kaolin analysis previously given shows about 1% of these bonding agents measured as oxides. The amount of the bonding agent added as a part of the kaolin when this clay is used should therefore be subtracted from the amount of bonding agent to be separately added.

Similarly, several forms of silica having a purity of 99% are commercially available. By using silica of this purity the bonding effect of any impurities present can usually be ignored. However, some beach sand having impurities of the order of 10% or so can be used if the quantity of bonding agent supplied by the impurities is taken into account in determining the proportions of ingredients used. Similarly also, clays having a degree of impurity greater than the kaolin specifically referred to above can be used if the impurities are allowed for in the mix.

A very suitable natural material for supplying the additional bonding agent used in the new ceramic mix is feldspar, a typical sample of which has the following chemical analysis:

| | Percent |
|---|---|
| $SiO_2$ | 69 |
| $Al_2O_3$ | 18.4 |
| $K_2O$ | 8.66 |
| $Na_2O$ | 3.4 |

Thus the active bonding agents introduced by the feldspar are potassium oxide ($K_2O$) and sodium oxide ($Na_2O$). Together they constitute 12% of the feldspar.

It may be desirable to substitute for some or all of the feldspar other compounds or mixtures containing the desired bonding agents, and this may be done if such substances are substituted in the mix on a molecular equivalent basis. For example, ten pounds of feldspar contain .0147 pound moles of sodium oxide and potassium oxide. This amount of feldspar is equivalent, on a molecular basis, to 1.56 pounds of sodium carbonate, 1.47 pounds of calcium carbonate, 1.32 pounds of lithium metasilicate, or 3.3 pounds of GD grade of sodium silicate (which analyzes 27.5% sodium oxide). Similar substitutions on a molecular equivalent basis can be made for other materials containing one or more of the desired bonding agents.

Two examples of highly satisfactory ceramic crucible mixes which were formed of natural materials selected and proportioned in accordance with the invention are set forth in the following table under batch No. 1 and batch No. 2.

| Material | Batch No. 1, lbs. | Batch No. 2, lbs. |
|---|---|---|
| Coarse silica (sand) | 48 | 55 |
| Fine silica (ground sand) | 10 | 10 |
| Florida kaolin | 30 | 30 |
| Feldspar | 12 | 5 |
| Calcium carbonate | None | 1½ |
| Water | 12 | 8 |

In regard to the equivalency of the materials used in the two batches, calculation will show that the calcium carbonate in batch No. 2 is approximately equivalent to the additional feldspar in batch No. 1 so far as the quantity of bonding agent is concerned.

A more precise analysis of batch No. 1 above, which is more in accord with the first table given, indicates the following.

The 12 pounds of feldspar is seen to contribute some bonding agent, some clay, and some fine silica. The 30 pounds of kaolin contributes the major clay component and some bonding agent.

If the approximate formula for kaolinitic clays is assumed as $Al_2O_3 \cdot 2SiO_2$, then 12 pounds of feldspar is equivalent to:

$$12 \times 18.4\% = 2.208 \text{ pounds of } Al_2O_3$$

For the formula $Al_2O_3 \cdot 2SiO_2$ it then can be calculated that for 2.208 pounds of $Al_2O_3$ there would be $$2.208 \times 120/102 = 2.596 \text{ pounds}$$

of $SiO_2$ which can be considered along with the 2.208 pounds of $Al_2O_3$ as constituting an addition to the clay component. Since there is a total of $12 \times 69\% = 8.28$ pounds of $SiO_2$ in the 12 pounds of feldspar, then 8.28 minus 2.596 = 5.684 pounds of free silica remaining. Also in the 12 pounds of feldspar there are $$12 \times 8.66\% = 1.0392 \text{ lbs.}$$

of $K_2O$ and $12 \times 3.4\% = .408$ lb. $Na_2O$.

Thus, summing up the 12 pounds of feldspar, it can be considered as:

4.804 pounds of clay
5.684 pounds of fine silica
.01105 mole $K_2O$, .00658 mole $Na_2O = .01763$ pound mole of bonding agent Consideration of the 30 pounds of kaolin in batch No. 1 shows that it contains some bonding agent approximately as follows:

| | | Mole |
|---|---|---|
| $30 \times .004 = .012$ pound CaO | | .00021 |
| $30 \times .0032 = .096$ pound $Na_2O$ | | .00155 |
| $30 \times .0026 = .078$ pound $K_2O$ | | .00083 |
| Total moles of oxides of alkaline earths and metals in 30 pounds kaolin | | .00259 |
| Moles in 12 pounds feldspar | | .01763 |
| Total moles in batch No. 1 | | .02022 |

Batch No. 1, therefore, may be expressed as in the first table set forth as approximately:

Coarse silica, 48 pounds
Fine silica, 10+5.7 pounds=15.7 pounds
Clay, 30+4.8 pounds=34.8 pounds
Bonding agent, .01763+.00259 mole=.02022 mole As typical examples of the method for making the crucibles, batch No. 1 was mixed in a muller type mixer and placed in conventional apparatus (not shown) which extruded the material to form blank slugs which, after a short period of air drying, were pressed into the crucible shape on a hydraulic press. The formed crucibles were then dried and fired in a tunnel kiln to cone 16, or about 2550° F. The fired crucibles were tested in combustion analytical apparatus of the character illustrated in FIG. 2 in which each crucible was loaded with one gram of powdered iron, one gram of tin, and a small amount of copper. Oxygen was supplied as a jet to the sample at one liter per minute and the combustion apparatus turned on to ignite the sample. Each crucible and its contents heated up with the extreme rapidity characteristic of this service, and the heat was maintained for about six minutes. None of the crucibles failed from thermal shock, and all had such improved resistance to attack by the molten metals and oxides present that crucible failure from slag penetration was eliminated.

The material of batch No. 2 was mixed in a muller type mixer and screened through a ten mesh sieve and the wet granules placed directly in a crucible die cavity on a hydraulic press where the crucibles were pressed at four tons pressure. After drying, the crucibles were fired in a tunnel kiln to cone 16 and were then tested in analytical combustion apparatus in the same manner as the crucibles of batch No. 1. As with batch No. 1 crucibles, there were no failures from any cause which resulted in the loss of any of the sample even though several hundred of such crucibles were tested.

Crucibles manufactured from the ceramic mix described have a comparatively rough, grainy appearance because of the very large size of the silica particles. The physical values are quite high however, and the resistance to cracking from thermal shock is far greater than that of any high quality crucibles made from special mixes based upon such highly refractory substances as zirconium silicate, aluminum oxide, or mullite for instance. Furthermore, the resistance to penetration by molten metals and metal oxides is very high. An additional advantage is that the materials used in the mix are readily obtainable in a sulfur free condition, whereas zirconium silicate, previously most often used as the base for high quality crucibles of this type is almost always contaminated by some sulfur compounds which give trouble when such crucibles are used for sulfur analysis.

In any event, from extensive testing it is clear that the crucible described and, more particularly, the mix or body from which it is made is highly superior to any alternative mixes or substances I have ever become aware of. This is an unusual situation, since silica sand has always been considered to be a quite unsatisfactory ingredient for ceramic materials which are called upon to resist very high thermal shock, much less the extremely high thermal shock encountered in the service for which the presently described substance is intended.

The particular factors which are controlling in the mix, as has been pointed out previously, are: A major portion of the mix is silica, and much the major portion of the silica component must be very coarse by ceramic standards. The clay component by ceramic standards is relatively minor, and in fact all fine ground materials constitute no more than about half of the mix. The bonding agent is principally an alkaline metal or alkaline earth, preferably mostly the former, and these bonding agents are used in small quantity only. The firing temperature should be high enough to develop ceramic bonding and I have found that firing to cone 16 is satisfactory. This is about 2550 F.

The resistance to penetration of these crucibles is so great that even though a small hole is made through the crucible wall so that the molten charge can seep through to the outside, the hole does not enlarge. In fact tests with double the normal crucible charge of such difficult to contain substances as chromium, titanium, manganese, nickel, tungsten, vanadium, etc. did not result in any losses. Under similar circumstances with any prior crucibles that I know about, the losses would have been considerable.

Crucibles made according to this invention are slightly porous, but for most purposes this porosity is of no consequence. If, however, one has need for a filtering substance where it is desired to have a high degree of porosity characterized by the presence of very fine, highly uniform passages, along with high resistance to thermal shock and high temperatures, this result is easy of accomplishment. It has been previously stated that some fine silica (preferably not more than 20%, but permissably up to 30%) can be tolerated so long as the objective is to obtain a crucible intended for combustion analysis. If a filtering material is desired, the fine silica is excluded from the mix in so far as this is practical.

For instance, a practical material was given above and identified as "Batch No. 1." This ceramic is only slightly porous. A crucible substantially as shown in FIG. 1, made of this material, when placed under the suction effect of a water aspirator, will filter about 100 ml. of water in 25 minutes. If the batch No. 1 mix is changed so that the ten parts of fine silica is eliminated and replaced by ten additional parts of coarse silica, such that the mix contains no fine silica, but 58 parts of coarse silica, everything else being the same, the ceramic material becomes an excellent filtering medium. Crucibles made thereof and tested in the same vacuum filtering configuration filtered 100 ml of water in 70 seconds rather than requiring 25 minutes.

The following range given for mixes intended for practical filtering materials, it will be noted, falls within the ranges previously given and the range primarily is more restricted in that no fine silica is used, excepting for the small amount (up to about 7%) introduced along with the feldspar.

| | |
|---|---|
| Coarse silica, percent | 50 to 60 |
| Fine silica, percent | 0 to 7 |
| Clay, percent | 20 to 45 |
| Bonding agents (expressed as pound moles of alkali metal oxides and alkali earth oxides per 100 pounds of mix) | .010 to .026 |

Although it is possible to go somewhat beyond these limits, it has been found that with much less than 50% coarse silica the filtering action is rather slow, while much more than 60% coarse silica is likely to lead to lower than desirable physical strength.

The unique properties of this filtering medium which enable it to withstand extremely high temperatures and extreme thermal shock have been used to advantage in a process forming the subject matter of the copending patent application of Eugene L. Bennet, entitled "Method and Apparatus for Combustion Analysis," filed of even date herewith as Bennet Case 8. The essential feature of that invention, so far as it is of interest here, is that a filtering step is performed in a porous crucible to obtain a precipitate which is subsequently burned in the same crucible. The great convenience and economy of this operation will be appreciated by those accustomed to prior used methods.

In the claims, the quantities called for are of the substances in the pure form as explained in connection with the first table set forth above. These substances need not be supplied to the mix in the pure form however, since, as explained, many satisfactory natural substances will supply more than one of the ingredients. The coarse silica called for, as stated previously, is over 100 mesh.

Having described my invention, what I claim as new and useful is:

1. The method of manufacturing a porous filtering laboratory crucible which comprises providing a mixture consisting essentially of coarse silica of from 60 to 100 mesh in the amount of 50 to 60%, fine silica of under 100 mesh in the amount of 0 to 7%, clay in the amount of 20 to 45%, and bonding agents, the bonding agents being compounds of elements in subgroup A of group I and subgroup A of group II of the periodic table, said compounds supplying .010 to .026 pound moles of oxides of said elements per hundred pounds of total silica and clay, the total of the fine material being insufficient to fill the voids within the coarse material, adding sufficient liquid to the mixture to provide a plastic body, shaping the plastic body to desired crucible form, and drying and firing the article thus produced to substantially cone 16.

2. The method called for in claim 1 in which at least the major portion of the bonding agents is in the form of insoluble compounds.

3. The method of manufacturing a porous laboratory crucible which comprises providing a mixture consisting essentially of coarse silica of from 60 to 100 mesh in the amount of 45 to 60%, fine silica of under 100 mesh in an amount not over 20%, clay in the amount of 30 to 35%, and bonding agents, said bonding agents consisting of compounds of elements in subgroup A of group I and sugbroup A of group II of the periodic table, said bonding agents being present in the amount of from .017 to .023 pound moles of said elements per 100 pounds of total silica and clay, the total of the fine material being insufficient to fill the voids within the coarse material, adding sufficient liquid to the mixture to provide a plastic body, shaping the plastic body to desired crucible form, and drying and firing the article thus produced to substantially cone 16.

4. The method called for in claim 3 in which at least the major portion of the bonding agents is in the form of insoluble compounds.

References Cited in the file of this patent

UNITED STATES PATENTS

| | | |
|---|---|---|
| 1,018,665 | Jaxtheimer | Feb. 27, 1912 |
| 1,221,618 | Sperr et al. | Apr. 3, 1917 |
| 1,576,550 | Rochow | Mar. 16, 1926 |
| 1,818,506 | Ross et al. | Aug. 11, 1931 |